United States Patent
Ruiz Donate

(10) Patent No.: US 10,163,418 B2
(45) Date of Patent: Dec. 25, 2018

(54) LOW POWER LCD DRIVER CIRCUIT

(71) Applicant: The Swatch Group Research and Development Ltd, Marin (CH)

(72) Inventor: Alberto Ramon Ruiz Donate, Marin (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/727,815

(22) Filed: Oct. 9, 2017

(65) Prior Publication Data

US 2018/0130439 A1    May 10, 2018

(30) Foreign Application Priority Data

Nov. 9, 2016 (EP) .................................. 16197902.6

(51) Int. Cl.
| | | |
|---|---|---|
| *G09G 3/36* | (2006.01) | |
| *H02J 7/00* | (2006.01) | |
| *H02M 3/07* | (2006.01) | |
| *G09G 3/20* | (2006.01) | |

(52) U.S. Cl.
CPC .............. *G09G 3/3696* (2013.01); *G09G 3/36* (2013.01); *H02J 7/0063* (2013.01); *H02M 3/07* (2013.01); *G09G 3/20* (2013.01); *G09G 2310/0289* (2013.01); *G09G 2330/02* (2013.01); *G09G 2330/021* (2013.01); *G09G 2330/028* (2013.01)

(58) Field of Classification Search
CPC ....... G09G 2310/0289; G09G 2330/02; G09G 2330/021; G09G 2330/028; G09G 3/20; G09G 3/36; G09G 3/3696; H02J 7/0063; H02M 3/07
See application file for complete search history.

(56) References Cited

U.S. PATENT DOCUMENTS

| | | |
|---|---|---|
| 6,633,287 B1 | 10/2003 | Yatabe et al. |
| 2002/0036636 A1 | 3/2002 | Yanagi et al. |
| 2009/0244110 A1 | 10/2009 | Ogura |
| 2009/0309568 A1 | 12/2009 | Hisano |

(Continued)

FOREIGN PATENT DOCUMENTS

EP    1 180 762 A2    2/2002

OTHER PUBLICATIONS

European Search Report dated Mar. 10, 2017 in European Application 16197902.6, filed on Nov. 9, 2016.

*Primary Examiner* — Dmitriy Bolotin

(74) *Attorney, Agent, or Firm* — Oblon, McClelland, Maier & Neustadt, L.L.P.

(57) ABSTRACT

A driver circuit for an electronic display, including a power supply system configured to provide a reference voltage, a DC-DC converter having an input connected to the power supply system and having at least a first output configured to provide a first driving voltage, a second output configured to provide a second driving voltage and a third output configured to provide a third output voltage, wherein the second output voltage is higher than the first output voltage and wherein the third output voltage is higher than the second output voltage, wherein the DC-DC converter includes at least a first charge pump, and wherein the input is directly connectable to the second output to provide the reference voltage as the second output voltage.

14 Claims, 2 Drawing Sheets

(56) References Cited

U.S. PATENT DOCUMENTS

| | | | |
|---|---|---|---|
| 2009/0323378 A1* | 12/2009 | Melse | H02M 3/07 |
| | | | 363/60 |
| 2015/0180355 A1* | 6/2015 | Freeman | H02M 1/08 |
| | | | 363/21.04 |
| 2016/0116925 A1* | 4/2016 | Freeman | H02M 3/33546 |
| | | | 307/130 |
| 2017/0099011 A1* | 4/2017 | Freeman | H02M 7/06 |
| 2017/0133842 A1* | 5/2017 | Freeman | H02J 1/00 |
| 2018/0076635 A1* | 3/2018 | Maalouf | H02J 7/008 |

* cited by examiner

LOW POWER LCD DRIVER CIRCUIT

This application claims priority from European Patent Application No. 16197902.6 filed on Nov. 9, 2016, the entire disclosure of which is hereby incorporated herein by reference.

FIELD OF THE INVENTION

The present invention relates to the field of driver circuits for an electronic display, in particular for a liquid crystal display (LCD). In further aspects the invention relates to such a liquid crystal display as well as to a portable electronic device comprising a LCD, such as a watch, a smartwatch or a smartphone.

BACKGROUND OF THE INVENTION

For driving a liquid crystal display several DC voltage levels have to be provided to supply the rows and columns of a matrix of pixels of the display with an appropriate electric power. In order to provide various different voltage levels a resistance-dividing scheme or a driver circuit comprising at least one charge pump are known. Document U.S. Pat. No. 6,975,314 B2 describes a display driver having a battery and having numerous regulators whose input is connected to a positive electrode of the battery and whose VSS is connected to the negative electrode of the battery. The output voltages provided by the various regulators might be set to 1.5 V, 3.0 V and 4.5 V.

Generation of multiple and different voltage levels from a given battery voltage typically implies generation of a low voltage level of e.g. 1.5 V and to derive higher voltage levels by multiplying the low voltage level with a given factor, e.g. with a factor of 2 or 3.

Especially for mobile electronic devices it is a general aim to reduce power consumption of the electronic display. It is therefore an aim of the present invention to provide an improved driver circuit for an electronic display such as a LCD that requires less electric power and which enables a longer lifetime of a battery. It is a further aim to provide an improved liquid crystal display exhibiting a reduced power consumption and to provide a portable electronic device comprising such a display.

The patent application EP 1 180 762 A2 describes an image display device with a driver circuit. The driver circuit includes a power supply source connected to a voltage regulator to supply a power supply for first and second charge pumps. The first charge pump is provided to generate at output a scanning voltage Vgh and the second charge pump is provided to generate a non-scanning voltage Vgl. Nothing is described concerning the supply of a low reference voltage for the two charge pumps when the voltage level of the power supply drops below a predefined threshold in order to operate at a low voltage, which is a drawback.

SUMMARY OF THE INVENTION

In a first aspect, there is provided a driver circuit for an electronic display. The driver circuit comprises a power supply system configured to provide a reference voltage. The driver circuit further comprises a DC-DC converter having an input connected to the reference voltage of the power supply system and having at least a first output configured to provide a first driving voltage. The DC-DC converter further has at least a second output configured to provide a second driving voltage. The second driving voltage is higher than the first driving voltage.

In a second aspect, the DC-DC converter has the first output to provide the first driving voltage, the second output to provide the second driving voltage and at least a third output configured to provide a third driving voltage. The second driving voltage is higher than the first driving voltage and the third driving voltage is higher than the second driving voltage.

The DC-DC converter further comprises at least a first charge pump and the input of the DC-DC converter is directly connectable internally to the second output to provide the reference voltage as the second driving voltage. In this way the driver circuit follows an approach to directly use the reference voltage provided by a power supply system as a second driving voltage for an interface of the driver circuit that is operable to process digital input signals and to activate a single or several selected pixels of the electronic display.

By means of the at least first charge pump the reference voltage is either divided or multiplied by a given factor to provide the first and/or the third driving voltages. If for example three different levels of first, second and third driving voltages are required, such as 1.5 V, 3 V and 4.5 V, the power supply system of the driver circuit is configured to provide a reference voltage of 3 V and the DC-DC converter is configured to provide a first driving voltage at 1.5 V and to provide a third driving voltage of 4.5 V.

The DC-DC converter is configured to derive the first driving voltage by dividing the provided reference voltage by a given factor, e.g. by a factor of 2 and to provide the third driving voltage by multiplying the reference voltage with a given factor, e.g. by a factor of 1.5.

In this way and since the reference voltage provided by the power supply system is chosen as an intermediate voltage of the three different output voltages, the power consumption of the driver circuit can be reduced and a battery lifetime can be prolonged.

According to an embodiment the DC-DC converter comprises a first charge pump and a second charge pump, each of which having a high voltage port and low voltage port. Typically, by means of the first charge pump the reference voltage provided by the power supply system can be divided by a given factor to provide the first driving voltage at the first output. By means of the second charge pump the reference voltage provided by the power supply system can be multiplied by a given factor to provide the third driving voltage at the third output of the DC-DC converter. In this configuration and with the input directly connected to the second output the second driving voltage does not require any modification. A voltage follower may be used to ensure proper output regarding load. The first driving voltage is obtained by voltage division and the third driving voltage is obtained by voltage multiplication.

Hence, the second or an intermediate driving voltage is selected in accordance to an available reference or input voltage. One of the first and the third driving voltages is then obtained by multiplication of the reference voltage and the other one of the first and the third driving voltages is obtained by a division of the reference voltage.

In one embodiment the high voltage port of the first charge pump is connectable to the input. It is conceivable, that the high voltage port of the first charge pump is selectively connectable to the input. It may be disconnected from the input if required. By connecting the high voltage port of the first charge pump to the input the first charge pump is operable in a voltage dividing mode. Hence, at a low voltage port of the first charge pump the first driving voltage will be obtained which is equal to the second driving voltage or equal to the reference voltage divided by a given factor, e.g. divided by a factor of 2 or 3.

In another embodiment the low voltage port of the second charge pump is connectable to the input. The low voltage port of the second charge pump may be selectively connected to the input. It may be also disconnected from the input if required. When the low voltage port of the second charge pump is connected to the input and hence to the reference voltage the second charge pump acts and operates as a voltage multiplier. Here, the reference voltage provided at the low voltage port of the second charge pump is multiplied by a given factor, e.g. by a factor 2 or 3 to provide the third driving voltage.

Typically, the second output of the DC-DC converter comprises a node that is connected to both, the high voltage port of the first charge pump and to the low voltage port of the second charge pump. Typically, the first and the second charge pumps are connected to a common input. The high voltage port of the first charge pump is electrically connected to the low voltage port of the second charge pump.

In another embodiment the first output is connected to the low voltage port of the first charge pump. When the high voltage port of the first charge pump is connected to the reference voltage and hence to the second output the first charge pump behaves and operates as a voltage divider. Consequently, at the low voltage port of the first charge pump and hence at the first output of the DC-DC converter the reference voltage divided by a given factor will be provided as the first driving voltage.

In a further embodiment the second output is connected to the high voltage port of the first charge pump and to the low voltage port of the second charge pump. In this mode of operation the first charge pump operates as a voltage divider and the second charge pump operates as a voltage multiplier. For example the first charge pump may be configured to divide the reference voltage provided by the power supply system by a factor 2 and the second charge pump may be configured to multiply the reference voltage provided by the power supply system by a factor of 1.5. With a given reference voltage of e.g. 3 V voltage levels of 1.5 V and 4.5 V can be provided as first and third driving voltages at the first and the third outputs of the DC-DC converter, respectively.

In view of the respective currents provided at the first, the second and the third outputs the total power consumption of the driver circuit can be reduced compared to a configuration wherein a lowest driving voltage is multiplied by a first charge pump and wherein an output voltage of the first charge pump is further multiplied by a second charge pump. In this way, total power consumption of the driver circuit can be effectively reduced and battery lifetime can be prolonged.

In one embodiment the third output is connected to the high voltage port of the second charge pump. In this configuration and when the power supply system is directly connected to the second output and hence to the low voltage port of the second charge pump the second charge pump behaves and operates as a voltage multiplier.

With another embodiment the driver circuit also comprises a switch or a multiplexer that is connected to the input. The switch or the multiplexer is configured to selectively connect the input and hence the output of the power supply system to the low voltage port of the first charge pump or to the high voltage port of the first charge pump. By means of the switch or multiplexer the driver circuit can be driven in two different modes. By providing a switching of the driver circuit between two different driving modes the driver circuit may dynamically adapt to varying reference voltage levels, e.g. provided by a power supply system.

If during operation the output voltage of the battery may successively decrease switching of the driver circuit from one driving mode to another driving mode may help to further operate the driver circuit even if the voltage level of the battery decreases.

In a further embodiment the driver circuit comprises a controller that is connected to the switch or multiplexer. The controller is configured to determine a voltage level of a battery of the power supply system. The controller is therefore also connected to the battery of the power supply system. The controller is configured to monitor a voltage level of the battery. Typically and if the controller detects a substantive decrease of the voltage level of the battery the controller is operable to initiate a switching of the driver circuit from one driving mode to another driving mode. By means of the controller an automatic switching of driving modes of the driver circuit can be provided. The automatic switching can be triggered by the actual voltage level of a battery of the power supply system.

The controller does not have to be implemented as an integral component of the driver circuit. It may be implemented by a separate circuit electrically connected to the driver circuit.

In another embodiment the controller is configured to switch the driver circuit between a default mode and a depleted mode. Default mode and depleted mode are two examples of two different driving modes of the driver circuit. When in the default mode the input of the DC-DC converter is connected to the high voltage port of the first charge pump. When in the depleted mode the input of the DC-DC converter is connected to the low voltage port of the first charge pump.

In the default mode the driver circuit operates as described above. Then, the reference voltage provided by the power supply system is directly used as a second driving voltage provided at the second output of the DC-DC converter. The first driving voltage is derived from the reference voltage through voltage division by means of the first charge pump and the third driving voltage is derived from the reference voltage by multiplying the reference voltage by means of the second charge pump.

In the depleted mode the input of the DC-DC converter is no longer directly connected to the second output but the input is connected to the low voltage port of the first charge pump. The input is hence connected to the first output. In the depleted mode the first charge pump as well as the second charge pump act and operate as voltage multipliers. Here, the reference voltage provided at the low voltage port of the first charge pump is multiplied by a given factor to provide a second driving voltage at the second output. Then, the second charge pump provides a multiplication of the second driving voltage to provide the third driving voltage at the third output.

In the depleted mode the driver circuit provides second and third driving voltages by multiplying a given reference voltage. In the depleted mode, the driver circuit can be operated with a reference voltage that is lower than the second driving voltage. In the event that a voltage level of a battery drops during lifetime of the battery the driver circuit may automatically switch into the depleted mode in which a lower reference voltage will be used to generate second and third driving voltages by means of the first and the second charge pump both operating in a voltage multiplication mode.

Accordingly and following a further embodiment the controller is configured to switch the driver circuit from the default mode into the depleted mode when the voltage level of the battery drops below a predefined threshold. In this way the driver circuit may consume more power compared to the default mode. But with a lower voltage level of the battery the driver circuit remains operable. In this way the battery lifetime can be prolonged and the electric power provided by the battery can be used more extensively.

According to another embodiment the power supply system comprises a battery and a reference voltage regulator connected to the battery. The reference voltage regulator is configured to provide a default reference voltage or to provide a depleted reference voltage as the reference voltage. By means of the reference voltage regulator at least two different reference voltage levels, namely the default reference voltage and a depleted reference voltage can be provided. Typically, the default reference voltage is higher than the depleted reference voltage. By means of the reference voltage regulator the reference voltage provided at the input of the DC-DC converter can be individually adapted in accordance to the driving mode of the driver circuit.

In a further embodiment the controller is connected to the reference voltage regulator to provide the depleted reference voltage when the voltage level of the battery drops below a predefined threshold. Typically, the controller may be operable to switch both, the switch or multiplexer and the reference voltage regulator simultaneously. When the controller switches the driver circuit from the default mode into the depleted mode the controller also switches the reference voltage regulator to replace the default reference voltage by the depleted reference voltage as the reference voltage. Then and when switched into the depleted mode, the DC-DC converter is provided with the depleted reference voltage. The depleted reference voltage may then be used as the first driving voltage provided at the first output. The second and the third driving voltages will be obtained by multiplication of the depleted reference voltage by means of the first charge pump and the second charge pump, respectively.

In another aspect the invention also relates to a liquid crystal display comprising a driver circuit as described above.

In still another aspect the invention also relates to a portable electronic device comprising a liquid crystal display or comprising at least one driver circuit as described above. The portable electronic device may be configured or may be implemented as a wristwatch, as a fitness tracker, as a smartwatch, as a mobile phone, as a smartphone or as a tablet computer or as a similar handheld portable electronic device.

BRIEF DESCRIPTION OF THE DRAWINGS

In the following an exemplary embodiment of a driver circuit for an electronic display is described in detail by making reference to the drawings, in which.

DETAILED DESCRIPTION OF THE INVENTION

Figure 1:
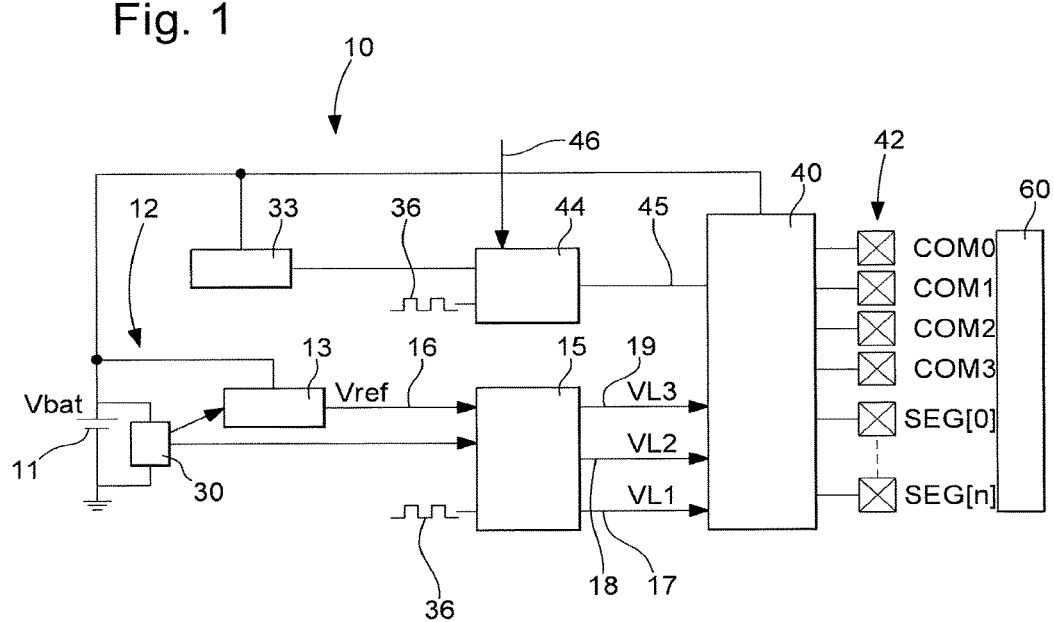
FIG. 1 shows a schematic block diagram of the driver circuit.

In FIG. 1, a driver circuit 10 for an electronic display, such as a LCD is schematically shown. The driver circuit 10 comprises a power supply system 12. The power supply system 12 comprises a battery 11 and a reference voltage regulator 13 that is connected to the positive electrode of the battery. The driver circuit 10 further comprises a DC-DC converter 15 which is shown in more detail in FIGS. 2-4. The DC-DC converter 15 has an input 16 connected to the power supply system 12. In the present embodiment the input 16 of the DC-DC converter 15 is connected to an output Vref of the reference voltage regulator 13. The DC-DC converter 15 can have a first output 17 and a second output 18. A third output 19 of the DC-DC converter can be provided in another embodiment shown in FIGS. 2-4. Each one of the first, the second and the third outputs 17, 18, 19 is connected to an interface 40 having a series of contact ports 42 by way of which the electronic display 60 is driven and operated.

For driving of the electronic display 60 the driver circuit 10 further comprises a digital signal processor 44. The digital signal processor 44 has at least one output 45 connected to the interface 40. The digital signal processor 44 has an input 46 to receive data to be displayed on the electronic display 60.

The digital signal processor 44 is also connected to the positive electrode of the battery 11 through a separate digital voltage regulator 33. Also the interface 40 is directly connected to the positive electrode of the battery 11. The regulators 13, 33, the DC-DC converter 15 and the processor 44 are also connected to the negative electrode of the battery 11 not shown on FIG. 1.

For operating the display 60 and for driving the driver circuit 10 the interface 40 has to be provided with at least two or even more different driving voltages VL1, VL2, VL3. As indicated in FIG. 1, the first driving voltage VL1 is provided at the first output 17, a second driving voltage VL2 is provided at the second output 18 and eventually a third driving voltage VL3 is provided at the third output 19.

The regulators 13, 33 may be implemented as low-dropout regulators (LDO). The digital signal processor 44 and the DC-DC converter 15 are typically but not necessarily driven by a clock signal, indicated with reference number 36 in FIG. 1.

In FIG. 1, there is further shown a controller 30 that is connected to the battery 11 and which is further connected to the reference voltage regulator 13 and to the DC-DC converter 15. The controller 30 is only shown exemplary. Its function may be implemented in a different way. The controller 30 or the functions provided by the controller may be also provided by any other logic circuit of the driver circuit 10 not illustrated here.

Figure 2:
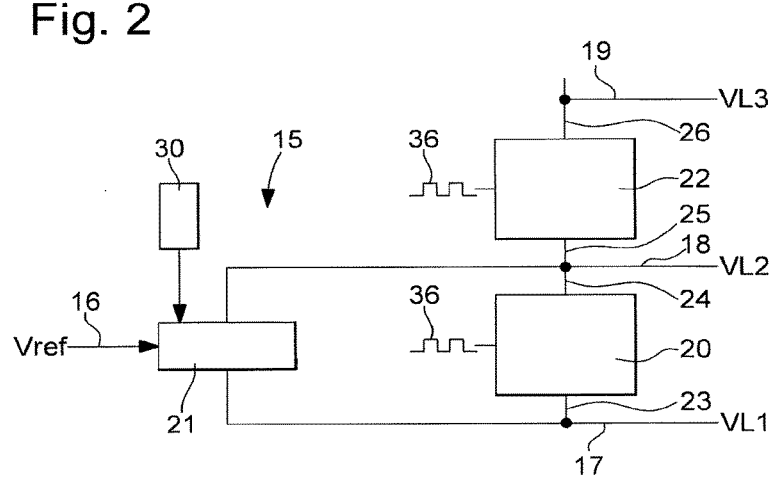
FIG. 2 shows a block diagram of a DC-DC converter.

In FIG. 2, a schematic block diagram of the DC-DC converter 15 is given. The DC-DC converter 15 comprises a first charge pump 20 and a second charge pump 22. The DC-DC converter 15 further comprises a switch or a multiplexer 21. The charge pumps 20, 22 may be also triggered and operated by a clock signal 36. The switch or multiplexer 21 is connected to the power supply system 12. By means of the switch or multiplexer 21, the reference voltage Vref can be selectively provided to a lower voltage port 23 or to a higher voltage port 24 of the first charge pump 20.

The first charge pump 20 and the second charge pump 22 are connected to a common input. The first charge pump 20 comprises a low voltage port 23 and a high voltage port 24. The low voltage port 23 is connected to the first output 17 and the high voltage port 24 of the first charge pump 20 is connected to the second output 18. The second charge pump 22 also has a low voltage port 25 and a high voltage port 26. The low voltage port 25 is connected to the high voltage port 24 of the first charge pump 20. The high voltage port 26 of the second charge pump 22 is connected to the third output 19. The switch or multiplexer 21 is switchable and controllable by the controller 30 as indicated in FIG. 2.

Figure 3:
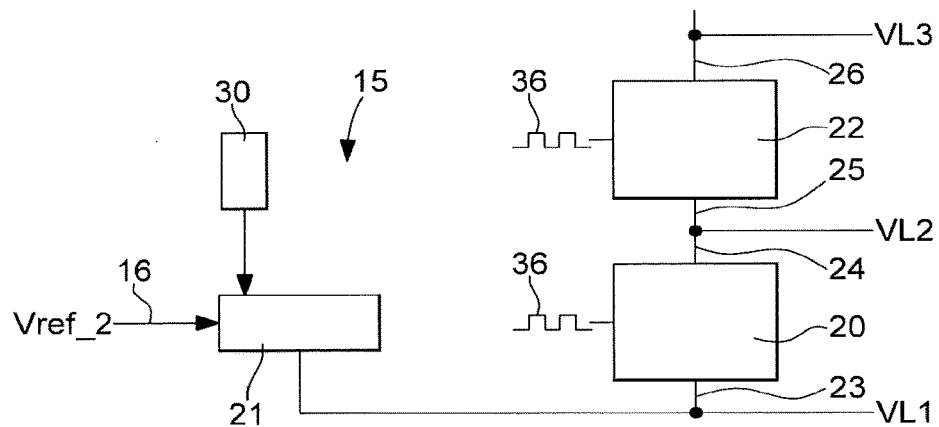
FIG. 3 shows a block diagram of the DC-DC converter when driven in depleted mode.
Figure 4:
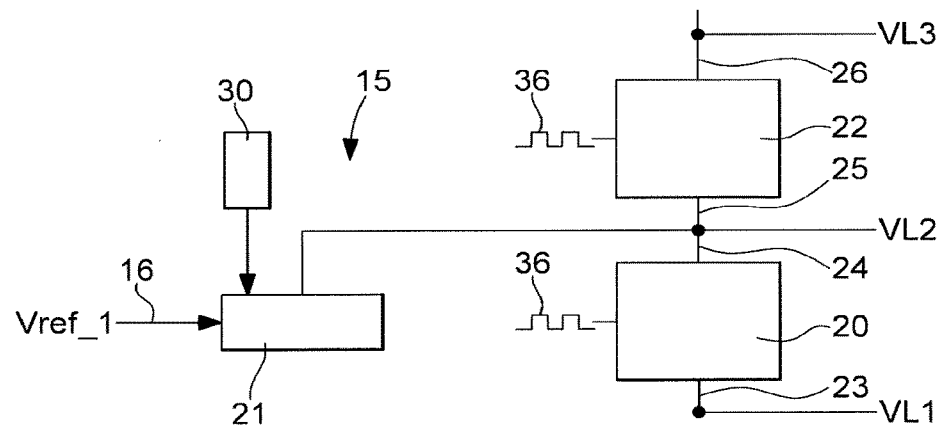
FIG. 4 shows a block diagram of the DC-DC converter when driven in the default mode.

In FIGS. 3 and 4, two different operation modes of the DC-DC converter 15 are illustrated. In the depleted mode as shown in FIG. 3 a rather low or depleted reference voltage Vref_2 is provided as the reference voltage. The switch or multiplexer 21 has disconnected the power supply system 12 from the second output 18. Rather, the switch or multiplexer 21 has connected the power supply system 12 and hence the depleted reference voltage Vref_2 to the first output 17, hence to the low voltage port 23 of the first charge pump 20. In the depleted mode a depleted reference voltage Vref_2 may be equal to e.g. 1.5 V. Then the first charge pump 20 will multiply the depleted reference voltage to obtain the second driving voltage. If the first charge pump 20 is configured to provide a multiplication by a factor of 2 then the second driving voltage VL2 will be equal to 3 V.

The second charge pump 22 may be configured to provide a voltage multiplication by a factor of 1.5. Then, the third driving voltage VL3 will be equal to 4.5 V at the third output 19.

In a more simplified embodiment, only a single charge pump 20 can be provided for obtaining the second driving voltage VL2 based on the lower first driving voltage VL1. The second driving voltage VL2 is higher than the first driving voltage VL1. For example VL2 can be at 2.1 V, whereas VL1 can be at 1.05 V obtained by dividing the second voltage VL2 by the factor 2 in the single charge pump 20, but the second voltage VL2 can be generated from the first driving voltage VL1 as shown in FIG. 3.

In the default driving mode, as shown in FIG. 4, the driver circuit 10 can be operated at a higher reference voltage, namely at a default reference voltage Vref_1. The default reference voltage Vref_1 may equal 3 V. In the default mode, the switch or multiplexer 21 connects the power supply system 12 to the node located between the first charge pump 20 and the second charge pump 22. The power supply system 12 will be directly connected to the second output 18 and hence the second driving voltage VL2 will be substantially equal to the default reference voltage Vref_1.

In the default driving mode the first charge pump 20 operates in a dividing mode and only the second charge pump 22 operates in a multiplication mode. The default reference voltage Vref_1 of e.g. 3 V will be multiplied by a factor of 1.5 by the second charge pump 22 to arrive at the third driving voltage of 4.5 V. The first charge pump 20 will operate to divide the default reference voltage Vref_1 by a factor of 2 to provide a first driving voltage VL1 of e.g. 1.5 V.

The factors of 2 or 1.5 as well as the various voltage levels as described herein are only exemplary. The concept of the DC-DC converter 15 as described herein can be transferred to various different specific configurations of first and second charge pumps 20, 22. Moreover, also totally different voltage levels than those as described herein can be used as the reference voltage as well as first, second and third driving voltages. The present concept is also not limited to only three different driving voltage levels. It may be expanded to even four or more different driving voltages at a respective number of outputs of the DC-DC converter 15.

In the default mode the total power consumption of the driver circuit 10 is reduced compared to the depleted mode. With a new battery the driver circuit 10 is typically driven in the default mode. As the voltage level of the battery 11 may drop after a certain while of operation the controller 30 is typically configured to activate the switch or multiplexer 21 simultaneously with the reference voltage regulator 13. Switching from the default mode according to FIG. 4 to the depleted mode as shown in FIG. 3 typically comes along with a disconnection of the second output 18 from the power supply system 12 and with establishing of a connection of the power supply system 12 with the low voltage port 23 of the first charge pump 20, that is the first output 17.

Simultaneous with this type of disconnection and connection the controller 30 may also trigger a switching of the reference voltage regulator 13 to provide a depleted reference voltage Vref_2 that is lower than the default reference voltage. In this way the voltage level of the battery 11 may even drop below the default reference voltage. A drop of the voltage level of the battery 11 below a given predefined threshold or below the default reference voltage Vref_1 can be monitored by the controller 30. In response to a drop of the voltage level of the battery 11 below the predefined threshold or below the default reference voltage Vref_1 the controller 30 may automatically switch the driver circuit 10 into the depleted mode as indicated in FIG. 3. Then, in the depleted mode the driver circuit can be operated for at least some time even with a decreased voltage level of the battery 11.

What is claimed is:

1. A driver circuit for an electronic display, comprising:
a power supply system configured to provide a reference voltage, the power supply system comprising a battery and a reference voltage regulator connected to the battery, wherein the reference voltage regulator is configured to provide a default reference voltage or a depleted reference voltage as the reference voltage,
a controller being connected to the reference voltage regulator to provide the depleted reference voltage when the voltage level of the battery drops below a predefined threshold,
a DC-DC converter having an input connected to the power supply system and having at least a first output configured to provide a first driving voltage and a second output configured to provide a second driving voltage, wherein the second driving voltage is higher than the first driving voltage,
wherein the DC-DC converter comprises at least a first charge pump, and wherein the input is directly connectable to the second output to provide the reference voltage as the second driving voltage.

2. The driver circuit according to claim 1, wherein the DC-DC converter has a third output configured to provide a third driving voltage, and wherein the third driving voltage is higher than the second driving voltage.

3. The driver circuit according to claim 2, wherein the DC-DC converter comprises the first charge pump and a second charge pump, each of which having a high voltage port and a low voltage port.

4. The driver circuit according to claim 3, wherein the high voltage port of the first charge pump is connectable to the input.

5. The driver circuit according to claim 3, wherein the low voltage port of the second charge pump is connectable to the input.

6. The driver circuit according to claim 3, wherein first output is connected to the low voltage port of the first charge pump.

7. The driver circuit according to claim 3, wherein the second output is connected to the high voltage port of the first charge pump and to the low voltage port of the second charge pump.

8. The driver circuit according to claim 3, wherein the third output is connected to the high voltage port of the second charge pump.

9. The driver circuit according to claim 3 and further comprising a switch or a multiplexer connected to the input and being configured to selectively connect the input to the low voltage port of the first charge pump or to the high voltage port of the first charge pump.

10. The driver circuit according to claim 9 and further comprising the controller connected to the switch or multiplexer and being configured to determine a voltage level of a battery of the power supply system.

11. The driver circuit according to claim 10, wherein the controller is configured to switch the driver circuit between a default mode and a depleted mode, wherein when in the default mode the input is connected to the high voltage port of the first charge pump and when in the depleted mode, the input is connected to the low voltage port of the first charge pump.

12. The driver circuit according to claim 11, wherein the controller is configured to switch the driver circuit from the default mode into the depleted mode when the voltage level of the battery drops below a predefined threshold.

13. A liquid crystal display LCD comprising a driver circuit according to claim 1.

14. A portable electronic device comprising a liquid crystal display according to claim 13.

* * * * *